United States Patent Office 3,183,242
Patented May 11, 1965

---

3,183,242
PROCESS FOR THE PRODUCTION OF 3-BENZOYL DERIVATIVES OF SUBSTITUTED HYDANTOINS
Karl Dithmar, Peter Koblischek, and Elfriede Naujoks, Frankfurt am Main, Germany, assignors to Deutsche Gold- und Silber-Scheideanstalt vormals Roessler, Frankfurt am Main, Germany
No Drawing. Filed May 29, 1963, Ser. No. 283,968
Claims priority, application Germany, May 30, 1962, D 39,046; Sept. 28, 1962, D 39,939; Dec. 18, 1962, D 40,530
2 Claims. (Cl. 260—309.5)

The present invention relates to an improved process for the production of 3-benzoyl derivatives of hydantoin of the formula:

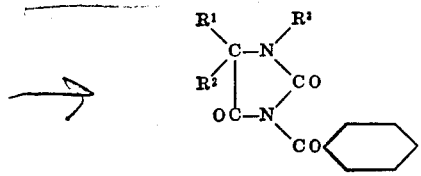

wherein each of $R^1$ and $R^2$ is hydrogen or lower alkyl and $R^3$ is hydrogen, lower alkyl, cycloalkyl, aryl, aralkyl or acyl.

U.S. application S.N. 141,299, filed September 28, 1961, describes the use of acylated hydantoins in washing and bleaching baths containing peroxidic bleaching agents as it was found that the presence of such acylated hydantoins activated such baths so that bleaching and brightening effects can be achieved at much lower temperatures than with baths devoid of such acylated hydantoins. The acylated hydantoins carrying a benzoyl substituent in position 3 and particularly those of 3,3-dimethyl hydantoin or of 3,3-dimethyl hydantoin also carrying a substituent in position 1 have proved particularly suited for this purpose. The benzoyl substituent can be introduced into position 3 of hydantoins analogously to the procedures employed for the production of other acylated hydantoins by reacting the hydantoin with a benzoyl halide in the presence of pyridine. This procedure, however, is relatively costly and therefore considerably deters the use of the resulting acylated products in washing and bleaching procedures.

A very large number of tests in which it was attempted to replace the pyridine by cheap inorganic bases, such as NaOH, soda, sodium bicarbonate and the like, under the most varied reaction conditions resulted only in unsatisfactory yields. Evidently this can be traced back to the fact that alkalies cause cleavage of the hydantoin ring (see Ingold, Sako and Thorpe, Journ. Chem. Soc., London, vol. 121 (1922), p. 1193).

It therefore was surprising that excellent results are obtained even when strong alkalies are used in the process according to the invention wherein the hydantoin is reacted with about an equivalent amount of alkali in an organic solvent to form the corresponding salt, the resulting reaction mixture is dehydrated and the water free hydantoin salt produced reacted with a benzoyl halide, such as benzoyl chloride or benzoyl bromide, at temperatures up to about 150° C.

It is important that the benzoylation in the process according to the invention is carried out within the temperature limit indicated as the low melting benzoyl derivatives which form first can rearrange themselves at higher temperatures even in the presence of acids to products of generally higher melting points. The production of such higher melting benzoylation products is not concerned in the present application.

The success of the process according to the invention furthermore is surprising as even in the reaction of 5,5-dimethyl hydantoin with water free alkalis only unsatisfactory results are obtained. It is only when the water produced in the salt formation according to the following reaction:

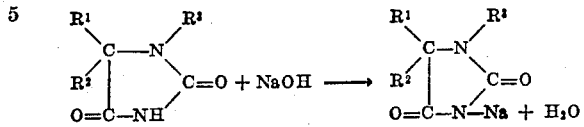

is completely removed that the benzoylation proceeds with the production of good yields.

The process according to the invention, for example, can be carried out by dissolving the starting hydantoin compound in an organic solvent, such as acetone, ethanol, dioxane and the like, and adding an equivalent amount of pulverized alkali, such as NaOH, to such solution, removing the free water formed in the ensuing reaction, for example, by the addition of a water binding agent, such as sodium sulfate or calcium chloride, and then adding about an equivalent quantity of benzoyl chloride to effect the benzoylation with the formation of the metal chloride corresponding to the metal of the alkali employed. When water miscible solvents are used in the benzoylation it is expedient to carry out the benzoylation at as low a temperature as possible, for example, 30–40° C.

Furthermore, according to an advantageous modification of the process according to the invention the starting hydantoin compound can be dissolved or suspended in an organic water immiscible solvent, such as benzene, toluene or xylene, and the alkali added thereto as hydroxide or oxide after moistening with a little water, heating such mixture to boiling and azeotropically distilling off the water introduced with the moistened alkali and produced in the reaction. The moistening of the alkali favors the salt formation at the beginning of the reaction. After the reaction is completed and the water distilled off azeotropically the benzoyl halide, preferably benzoyl chloride, is added gradually, if desired after permitting the dehydrated reaction mixture to cool. To complete the benzoylation after all of the benzoyl halide has been added it may be expedient to heat the reaction mixture. The chloride salt formed can be filtered off from the hot solution. Upon cooling the benzoylated product crystallizes and can be filtered off and washed with a little acetone and water to remove the chloride salt still retained therein. If desired, prefiltration of the hot solution may be omitted and the entire salt removed by the first wash. The alkali metal and alkaline earth metal hydroxides and oxides, such as the hydroxides or oxides of sodium, potassium, lithium, calcium, strontium or barium, can be used as the alkalies employed according to the invention.

The following examples will serve to illustrate the process according to the invention:

Example 1

A mixture of 128 g. (1 mol) of 5,5-dimethyl hydantoin, 40 g. of NaOH which had been slightly moistened and 1000 cc. of toluene was heated to boiling while stirring until the water introduced with the NaOH and that produced by the reaction had been distilled off azeotropically. Thereafter, 147 g. (1.05 mols) of benzoyl chloride were added dropwise while continuing the stirring and the mixture boiled under reflux until all of the Na salt of the 5,5-dimethyl hydantoin which adhered to the walls of the reaction vessel had fully reacted. Upon cooling the desired 3-benzoyl-5,5-dimethyl hydantoin precipitated out in the form of pure white crystals. The precipitate was filtered off and washed with acetone and then with water to remove the NaCl produced during the reaction. Upon drying the yield was 188 g. (81% of theory). Melting point 121–123° C.

Example 2

A mixture of 170 g. (1.0 mol) of 1-acetyl-5,5-dimethyl hydantoin of a melting point of 189–192° C. (produced according to the directions of Von Biltz and Slotta, J. prakt. Chemie, vol. 113, p. 245, 1926), 56 g. of KOH which had been slightly moistened and 500 cc. of xylene was heated to boiling while stirring until the water introduced with the KOH and that produced by the reaction had been distilled off azeotropically. Thereafter 147 g. (1.05 mols) of benzoyl chloride were added dropwise while continuing the stirring and the mixture boiled under reflux until all of the K salt of the 1-acetyl-5,5-dimethyl hydantoin which adhered to the walls of the reaction vessel had fully reacted. Upon cooling the desired 1-acetyl-3-benzoyl-5,5-dimethyl acetone precipitated out in the form of pure white crystals. The precipitate was filtered off and washed with ether, acetone-water and finally with water to remove the KCl produced during the reaction. Upon drying the yield was 218 g. (79.5% of theory). Melting point 124–125° C.

Example 3

A mixture of 142 g. (1.0 mol) of 1,5,5-trimethyl hydantoin, 40 g. of NaOH which had been slightly moistened and 750 cc. of toluene was heated to boiling while stirring until the water introduced with the NaOH and that produced by the reaction had been distilled off azeotropically. Thereafter 147 g. (1.05 mols) of benzoyl chloride were added dropwise while continuing the stirring and the mixture boiled under reflux until all of the Na salt of 1,5,5-trimethyl hydantoin which adhered to the walls of the reaction vessel had fully reacted. Upon cooling the desired 3-benzoyl-1,5,5-trimethyl hydantoin precipitated out in the form of crystals. The precipitate was filtered off and washed with acetone and then with water to remove the NaCl produced during the reaction. Upon drying the yield was 180 g. (73% of theory). Melting point 117–119° C.

Example 4

A mixture of 218 g. (1.0 mol) of 1-benzyl-5,5-dimethyl hydantoin, 56 g. of KOH which had been slightly moistened and 1000 cc. of toluene was heated to boiling while stirring until the water introduced with the KOH and that produced by the reaction had been distilled off azeotropically. Thereafter 147 g. (1.05 mols) of benzoyl chloride were added dropwise while continuing the stirring and the mixture boiled under reflux until all of the K salt of 1-benzyl-5,5-dimethyl hydantoin while adhered to the walls of the reaction vessel had fully reacted. Upon cooling the desired 1-benzyl-3-benzoyl-5,5-dimethyl hydantoin precipitated out in the form of crystals. The precipitate was filtered off and washed with acetone and then with water to remove the KCl produced during the reaction. Upon drying the yield was 228 g. (71% of theory). Melting point 108–110° C.

Example 5

25.6 g. of 5,5-dimethyl hydantoin (0.2 mol), 8.8 g. pulverized NaOH (0.22 mol) and about 33 cc. of ethanol were heated together until complete solution took place. Thereafter 100 cc. of ligroin were added to precipitate out the sodium salt of 5,5-dimethyl hydantoin which had formed. Thereafter the ligroin and the major portion of the alcohol were distilled off together with the water formed. Thereafter 100 cc. of acetone were added to the dehydrated residue and 35 cc. of benzoyl chloride (0.22 mol) added dropwise while stirring, whereupon the reaction took place with precipitation of NaCl, which was filtered off. Then ice and water were added to precipitate the 3-benzoyl-5,5-dimethyl hydantoin. The yield was about 65% of theory.

Example 6

128 g. of 5,5-dimethyl hydantoin (1 mol) were dissolved in about 650–700 cc. of acetone while warming in a 3 necked flask. Thereafter 44 g. of NaOH (1.1 mols) were added. The formation of sodium salt of 5,5-dimethyl hydantoin took place with warming and considerable thickening of the reaction solution. Then about 50–80 g. of water free $Na_2SO_4$ were introduced and 154.5 g. of benzoyl chloride added thereto dropwise at 30–40° C. over a period of about 1 hour. During the addition of the benzoyl chloride the solution became thinner. After the addition of the benzoyl chloride the reaction mixture was stirred for a further 2–3 hours at 30–40° C. to complete the benzoylation. The inorganic salts NaCl and $Na_2SO_4$ were filtered off and the 3-benzoyl-5,5-dimethyl hydantoin recovered by precipitation in an ice-water solution. The yield was 170 g. (70% of theory).

Example 7

A mixture of 176 g. of 1-phenyl-hydantoin, 40 g. of acetone, 40 g. of NaOH and 1500 cc. of toluene was heated to boiling while stirring until the water produced in the reaction had been distilled off azeotropically. The reaction mixture was allowed to cool off and then 147 g. of benzoyl chloride were added slowly while stirring. The reaction was completed by short boiling under reflux. Upon cooling the 1-phenyl-3-benzoyl hydantoin produced precipitated in a pure white form. After it had been filtered off it was first washed with acetone and then stirred with water to wash out the NaCl which had been produced and dried. The yield of 1-phenyl-3-benzoyl-hydantoin was 232 g. (83% of theory) with a melting point of 168–170° C.

We claim:
1. In a process for the production of a benzoylated hydantoin derivative of the formula

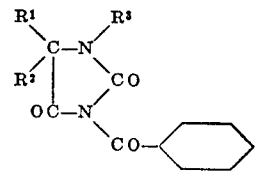

wherein each of $R^1$ and $R^2$ is selected from the group consisting of hydrogen and lower alkyl and $R^3$ is selected from the group consisting of hydrogen, lower alkyl, cycloalkyl, aryl, aralkyl and carboxylic acid acyl wherein a hydantoin derivative of the formula

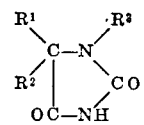

is reacted with an alkali selected from the group consisting of alkali metal and alkaline earth metal hydroxides and oxides and with a benzoyl halide the steps of first reacting said hydantoin derivative of the formula

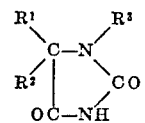

with about an equivalent quantity of said alkali in an inert organic solvent, removing the free water contained in the reacting mixture and then reacting the resulting dehydrated hydantoin salt in an inert organic solvent with a benzoyl halide selected from the group consisting of benzyol chloride and benzoyl bromide at a temperature up to 150° C.

2. The process of claim 1 in which the water produced in the first reaction is removed from the reaction mixture by azeotropic distillation.

References Cited by the Examiner

UNITED STATES PATENTS 3,117,139   1/64   Mooradian _____ 260—294.3

OTHER REFERENCES

Hackh's Chemical Dictionary, 3rd ed., page 18; Philadelphia, Blakiston, 1944.

Migrdichian Organic Synthesis, vol. 1, pages 319, 320, 321, 362, and 483; N.Y., Reinhold, 1957.

WALTER A. MODANCE, *Primary Examiner.*

NICHOLAS S. RIZZO, *Examiner.*